US012706919B2

(12) United States Patent
Tahaliyani et al.

(10) Patent No.: US 12,706,919 B2
(45) Date of Patent: Aug. 11, 2026

(54) SECURELY ACCESSING A BREAK-GLASS ACCOUNT

(71) Applicant: Dell Products, L.P., Round Rock, TX (US)

(72) Inventors: Seema M. Tahaliyani, Southborough, MA (US); Yuanyuan Zhang, Newark, CA (US); Ananthakrishnan Balakrishnan, Edison, NJ (US)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 18/478,470

(22) Filed: Sep. 29, 2023

(65) Prior Publication Data

US 2025/0112928 A1 Apr. 3, 2025

(51) Int. Cl.

*H04L 9/40* (2022.01)
*H04L 9/08* (2006.01)
*H04L 9/30* (2006.01)
*H04L 9/32* (2006.01)

(52) U.S. Cl.

CPC ............ *H04L 63/104* (2013.01); *H04L 9/085* (2013.01); *H04L 9/3073* (2013.01); *H04L 9/3268* (2013.01)

(58) Field of Classification Search

None

See application file for complete search history.

(56) References Cited

U.S. PATENT DOCUMENTS 10,061,914 B2 * 8/2018 Proulx .................. H04L 9/0863
10,733,329 B1 * 8/2020 Ragupathy ............. G06F 21/78
12,010,227 B1 * 6/2024 Chhabra ............ G06F 9/45558

(Continued)

OTHER PUBLICATIONS

M. Li, S. Yu, Y. Zheng, K. Ren and W. Lou, "Scalable and Secure Sharing of Personal Health Records in Cloud Computing Using Attribute-Based Encryption," in IEEE Transactions on Parallel and Distributed Systems, vol. 24, No. 1, pp. 131-143, Jan. 2013, doi: 10.1109/TPDS.2012.97. (Year: 2013).*

(Continued)

*Primary Examiner* — Rupal Dharia
*Assistant Examiner* — Shadi H Kobrosli
(74) *Attorney, Agent, or Firm* — Amin, Turocy & Watson, LLP

(57) ABSTRACT

A system can receive, from a remote computer, request data that identifies a request associated with a user account for credentials that are configured to access a computing resource, wherein the request data comprises a concealed value, and wherein the concealed value comprises a deployment public key that is concealed with an ephemeral secret key. The system can unlock the concealed value using a vendor secret key corresponding to the user account, to produce an unlocked concealed value. The system can send the unlocked concealed value to the remote computer, enabling the remote computer to determine a data encryption key based on processing the unlocked concealed value using the ephemeral secret key, enabling the remote computer to decrypt encrypted break-glass credentials using the data encryption key to produce break-glass credentials, and enabling the remote computer to access the computing resource using the break-glass credentials.

20 Claims, 20 Drawing Sheets

(56) References Cited

U.S. PATENT DOCUMENTS

| | | | | |
|---|---|---|---|---|
| 2005/0066175 | A1* | 3/2005 | Perlman | H04L 9/302 713/176 |
| 2009/0080662 | A1* | 3/2009 | Thibadeau | G06F 21/31 380/286 |
| 2013/0212393 | A1* | 8/2013 | D'Souza | H04L 9/0891 713/171 |
| 2016/0065370 | A1* | 3/2016 | Le Saint | H04L 9/321 713/155 |
| 2016/0218875 | A1* | 7/2016 | Le Saint | H04L 9/0822 |
| 2016/0366183 | A1* | 12/2016 | Smith | H04L 63/06 |
| 2018/0041336 | A1* | 2/2018 | Keshava | H04L 9/0891 |
| 2018/0248859 | A1* | 8/2018 | Zudic | H04L 63/06 |
| 2022/0131847 | A1* | 4/2022 | Shiner | H04L 9/0866 |
| 2022/0337402 | A1* | 10/2022 | Bourdages | H04L 9/0825 |
| 2023/0198968 | A1* | 6/2023 | Medvinsky | H04L 63/0435 713/155 |
| 2023/0421566 | A1* | 12/2023 | Smith, III | H04L 63/08 |
| 2025/0226974 | A1* | 7/2025 | Medvinsky | H04L 9/0825 |

OTHER PUBLICATIONS

AWS Well-Architected Framework, AWS, https://docs.aws.amazon.com/wellarchitected/2023-04-10/framework/sec_incident_response_pre_provision_access.html (Year: 2023).*

* cited by examiner

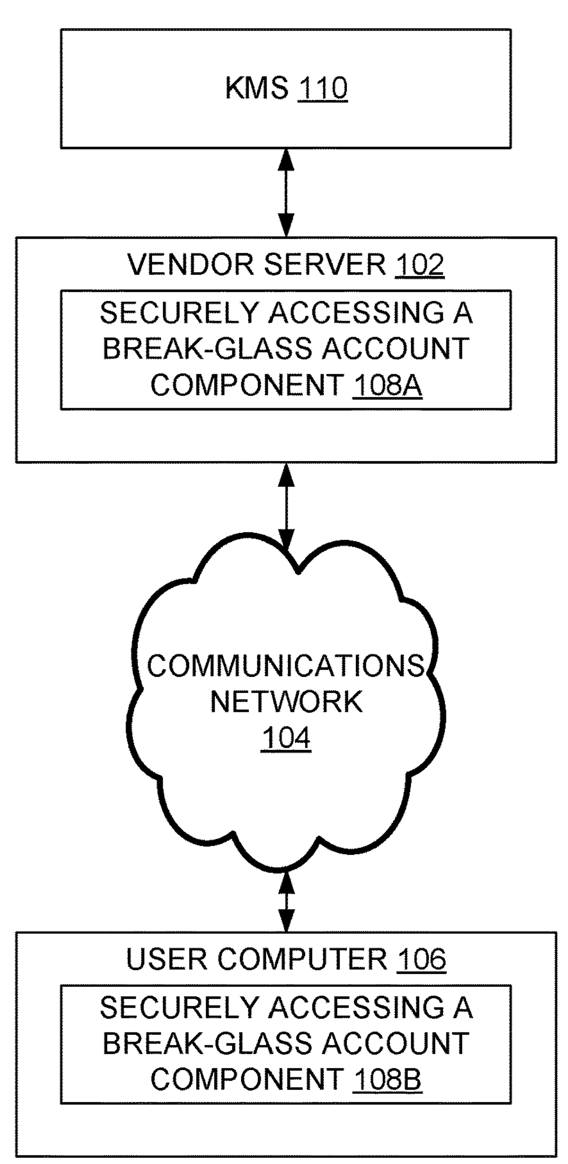
FIG. 1

500

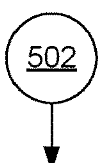

RECEIVING, FROM A REMOTE COMPUTER, REQUEST DATA THAT IDENTIFIES A REQUEST ASSOCIATED WITH A USER ACCOUNT FOR CREDENTIALS THAT ARE CONFIGURED TO ACCESS A COMPUTING RESOURCE, WHEREIN THE REQUEST DATA COMPRISES A CONCEALED VALUE, AND WHEREIN THE CONCEALED VALUE COMPRISES A DEPLOYMENT PUBLIC KEY THAT IS CONCEALED WITH AN EPHEMERAL SECRET KEY 504

UNLOCKING THE CONCEALED VALUE USING A VENDOR SECRET KEY CORRESPONDING TO THE USER ACCOUNT, TO PRODUCE AN UNLOCKED CONCEALED VALUE 506

SENDING THE UNLOCKED CONCEALED VALUE TO THE REMOTE COMPUTER, ENABLING THE REMOTE COMPUTER TO DETERMINE A DATA ENCRYPTION KEY BASED ON PROCESSING THE UNLOCKED CONCEALED VALUE USING THE EPHEMERAL SECRET KEY, ENABLING THE REMOTE COMPUTER TO DECRYPT ENCRYPTED BREAK-GLASS CREDENTIALS USING THE DATA ENCRYPTION KEY TO PRODUCE BREAK-GLASS CREDENTIALS, AND ENABLING THE REMOTE COMPUTER TO ACCESS THE COMPUTING RESOURCE USING THE BREAK-GLASS CREDENTIALS 508

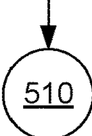

FIG. 5

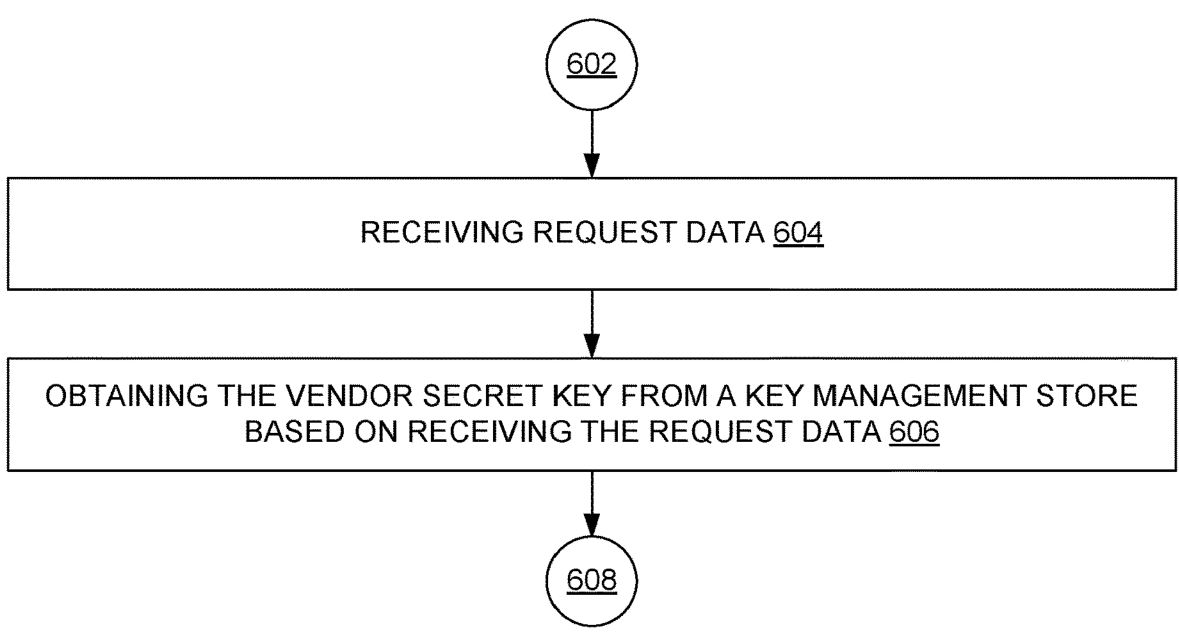
FIG. 6

700

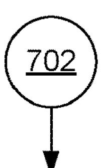

RECEIVING, FROM A REMOTE COMPUTER, REQUEST DATA THAT IDENTIFIES A REQUEST ASSOCIATED WITH A USER ACCOUNT FOR CREDENTIALS THAT ARE CONFIGURED TO ACCESS A COMPUTING RESOURCE 704

INITIALIZING CRYPTOGRAPHIC PARAMETERS FOR THE USER ACCOUNT, WHEREIN THE CRYPTOGRAPHIC PARAMETERS COMPRISE A FIRST NUMBER THAT IS A PRIMITIVE ROOT MODULO OF A SECOND NUMBER, AND WHEREIN THE SECOND NUMBER IS A PRIME NUMBER 706

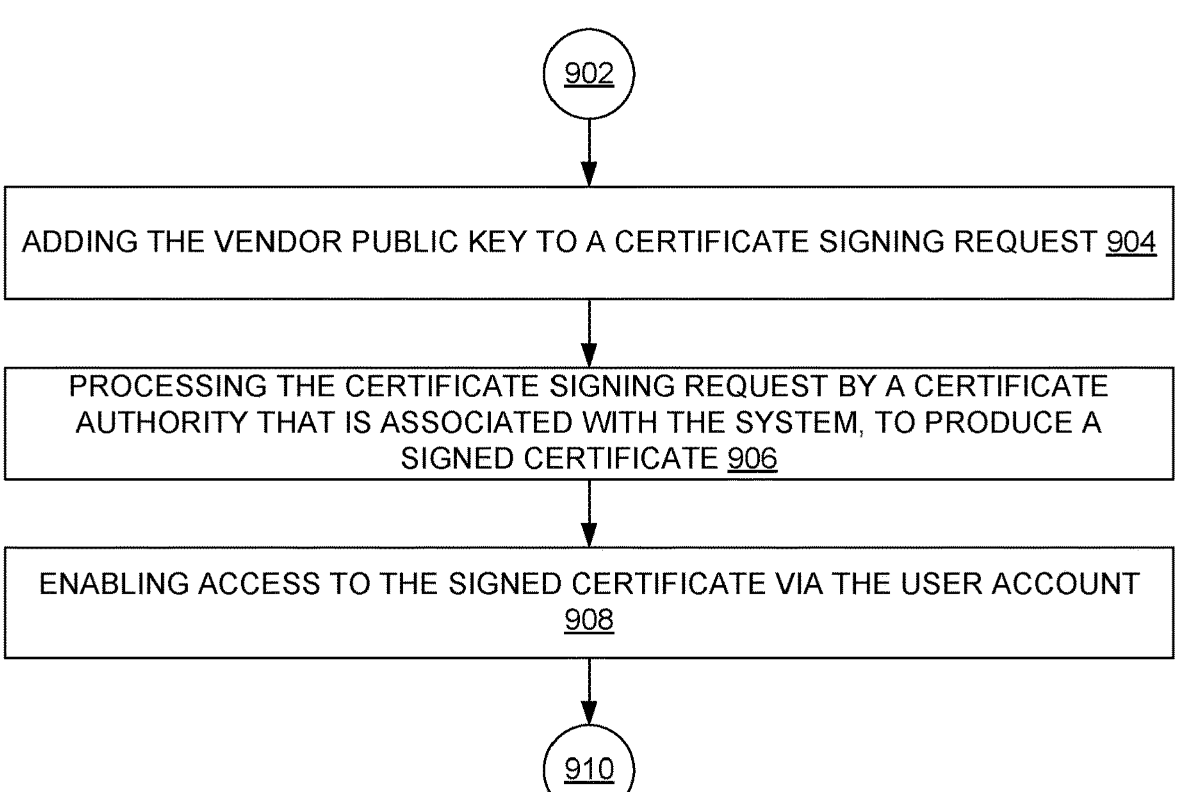
FIG. 9

1000

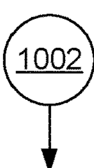

RECEIVING, FROM A REMOTE COMPUTER, REQUEST DATA THAT IDENTIFIES A REQUEST FROM A USER ACCOUNT FOR CREDENTIALS THAT ARE CONFIGURED TO ACCESS A COMPUTING RESOURCE, WHEREIN THE REQUEST DATA COMPRISES A FIRST VALUE, AND WHEREIN THE FIRST VALUE COMPRISES A DEPLOYMENT PUBLIC KEY THAT IS CONCEALED WITH AN EPHEMERAL KEY 1004

UNLOCKING THE FIRST VALUE WITH A VENDOR SECRET KEY, TO PRODUCE A SECOND VALUE 1006

SENDING THE SECOND VALUE TO THE REMOTE COMPUTER, AS A RESULT OF WHICH THE REMOTE COMPUTER IS ABLE TO DETERMINE A DATA ENCRYPTION KEY BASED ON PROCESSING THE SECOND VALUE WITH THE EPHEMERAL SECRET KEY, DECRYPT ENCRYPTED CREDENTIALS WITH THE DATA ENCRYPTION KEY TO PRODUCE THE CREDENTIALS, AND ACCESS THE COMPUTING RESOURCE USING THE CREDENTIALS. IN SOME EXAMPLES, THE CREDENTIALS CAN BE BREAK-GLASS CREDENTIALS 1008

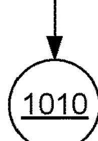

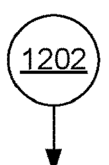

RECEIVING, FROM A REMOTE COMPUTER, REQUEST DATA THAT IDENTIFIES A REQUEST ASSOCIATED WITH A USER ACCOUNT FOR CREDENTIALS THAT ARE CONFIGURED TO ACCESS A COMPUTING RESOURCE 1204

INITIALIZING CRYPTOGRAPHIC PARAMETERS FOR THE USER ACCOUNT, WHEREIN THE CRYPTOGRAPHIC PARAMETERS COMPRISE A FIRST NUMBER AND A SECOND NUMBER, WHEREIN THE FIRST NUMBER COMPRISES A PRIMITIVE ROOT MODULO OF THE SECOND NUMBER, AND WHEREIN THE SECOND NUMBER COMPRISES A PRIME NUMBER 1206

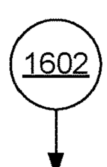

RECEIVING, FROM A REMOTE COMPUTER, REQUEST DATA THAT IDENTIFIES A REQUEST FROM A USER ACCOUNT FOR CREDENTIALS THAT ARE CONFIGURED TO ACCESS A COMPUTING RESOURCE, WHEREIN THE REQUEST DATA COMPRISES A VALUE, AND WHEREIN THE VALUE COMPRISES A FIRST PUBLIC KEY THAT IS ENCODED WITH A SECOND SECRET KEY 1604

UNLOCKING THE VALUE WITH A THIRD SECRET KEY, TO PRODUCE A SECOND VALUE 1606

SENDING THE SECOND VALUE TO THE REMOTE COMPUTER, THE REMOTE COMPUTER DETERMINING A DATA ENCRYPTION KEY BASED ON PROCESSING THE SECOND VALUE WITH THE SECOND SECRET KEY, THE REMOTE COMPUTER DECRYPTING ENCRYPTED CREDENTIALS WITH THE DATA ENCRYPTION KEY TO PRODUCE THE CREDENTIALS, AND THE REMOTE COMPUTER ACCESSING THE COMPUTING RESOURCE USING THE CREDENTIALS 1608

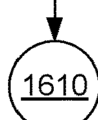

SECURELY ACCESSING A BREAK-GLASS ACCOUNT

BACKGROUND

There can be situations where a user is completely locked out or loses control of all their privileged accounts. In these emergency situations, it can be desired for the user to have access to a privileged break-glass account that can revert any controls or lockouts that are in place.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive, from a remote computer, request data that identifies a request associated with a user account for credentials that are configured to access a computing resource, wherein the request data comprises a concealed value, and wherein the concealed value comprises a deployment public key that is concealed with an ephemeral secret key. The system can unlock the concealed value using a vendor secret key corresponding to the user account, to produce an unlocked concealed value. The system can send the unlocked concealed value to the remote computer, enabling the remote computer to determine a data encryption key based on processing the unlocked concealed value using the ephemeral secret key, enabling the remote computer to decrypt encrypted break-glass credentials using the data encryption key to produce break-glass credentials, and enabling the remote computer to access the computing resource using the break-glass credentials.

An example method can comprise receiving, by a system comprising a processor from a remote computer, request data that identifies a request from a user account for credentials that are configured to access a computing resource, wherein the request data comprises a first value, and wherein the first value comprises a deployment public key that is concealed with an ephemeral secret key. The method can further comprise unlocking, by the system, the first value with a vendor secret key, to produce a second value. The method can further comprise sending, by the system, the second value to the remote computer, as a result of which the remote computer is able to determine a data encryption key based on processing the second value with the ephemeral secret key, decrypt encrypted credentials with the data encryption key to produce the credentials, and access the computing resource using the credentials.

An example non-transitory computer-readable medium can comprise instructions that, in response to execution, cause a system comprising a processor to perform operations. These operations can comprise receiving, from a remote computer, request data that identifies a request from a user account for credentials that are configured to access a computing resource, wherein the request data comprises a value, and wherein the value comprises a first public key that is encoded with a second secret key. These operations can further comprise unlocking the value with a third secret key, to produce a second value. These operations can further comprise sending the second value to the remote computer, the remote computer determining a data encryption key based on processing the second value with the second secret key, the remote computer decrypting encrypted credentials with the data encryption key to produce the credentials, and the remote computer accessing the computing resource using the credentials.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate securely accessing a break-glass account, in accordance with an embodiment of this disclosure;

FIG. 5 illustrates an example process flow that can facilitate securely accessing a break-glass account, in accordance with an embodiment of this disclosure;

FIG. 6 illustrates another example process flow that can facilitate securely accessing a break-glass account, in accordance with an embodiment of this disclosure;

FIG. 7 illustrates another example process flow that can facilitate securely accessing a break-glass account, in accordance with an embodiment of this disclosure;

FIG. 9 illustrates another example process flow that can facilitate securely accessing a break-glass account, in accordance with an embodiment of this disclosure;

FIG. 10 illustrates another example process flow that can facilitate securely accessing a break-glass account, in accordance with an embodiment of this disclosure;

FIG. 12 illustrates another example process flow that can facilitate securely accessing a break-glass account, in accordance with an embodiment of this disclosure;

FIG. 16 illustrates another example process flow that can facilitate securely accessing a break-glass account, in accordance with an embodiment of this disclosure;

DETAILED DESCRIPTION

Overview

Figure 2:
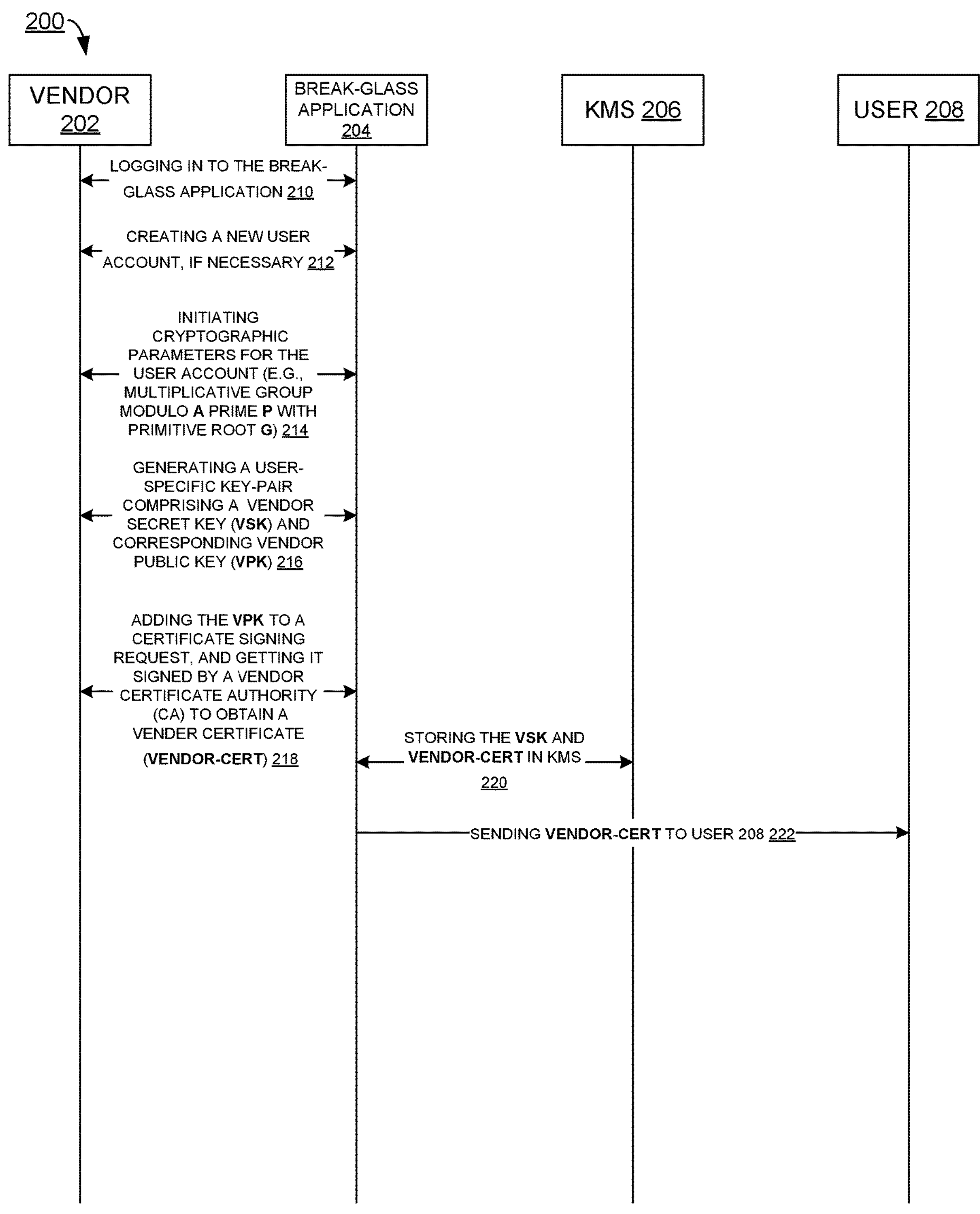
FIG. 2 illustrates an example signal flow for setting up a break-glass account, and that can facilitate securely accessing a break-glass account, in accordance with an embodiment of this disclosure.

Access to break-glass accounts credentials can be stored securely in a vault, with tightly controlled access. Access to these credentials can be audited and suitable alerts can be generated to inform other interested parties about the use of the break-glass account. Threats can exist when the credentials are generated and accessed. The present techniques can be implemented to facilitate a mechanism where, during deployment, break-glass account credentials can be encrypted by an encryption key that is derived using a vendor-provided public key and a deployment secret key belonging to a generated deployment key-pair. The encrypted credentials and public secret can be stored, while the deployment secret key is destroyed. To recover the encryption key, the public secret can be concealed with an operation using ephemeral key before sending it to vendor. The vendor can then use its vendor secret key to "unlock" the concealed value. The unlocked concealed value can then be exposed with the inverse operation using the ephemeral key to obtain the encryption key. The encryption key can then be used to decrypt the credentials.

The present techniques can be implemented such that the encryption key is not stored at all. Rather, the encryption key can be dynamically determined from information possessed by the user (where a user is referenced, this can comprise a computer that is associated with a particular user account) and vendor in such a manner that neither can glean information about the information that the other possesses. It can be that accessing any individual piece of a secret is not enough to compromise the security of the system.

Some prior approaches use user-generated credentials. A problem with this approach can be that an administrator on the user side can know the credentials, and there can be scope for misuse. Another problem with this approach can relate to the credentials needing to be stored in a vault, where access to the vault needs to be tightly controlled.

Some prior approaches use vendor-generated credentials. A problem with this approach can be that a user needs to contact the vendor to obtain credentials. Another problem can be that each credential needs to be unique per user. Another problem can be that, if vendor support has access to user sites, there can be scope for misuse.

In some examples, the present techniques can generally be categorized as setup, deployment, and credential recovery.

Example Architectures

FIG. 1 illustrates an example system architecture 100 that can facilitate securely accessing a break-glass account, in accordance with an embodiment of this disclosure.

System architecture 100 comprises vendor server 102, communications network 104, user computer 106, and key management system (KMS; sometimes referred to as a key management server) 110. In turn, vendor server 102 comprises securely accessing a break-glass account component 108A, and user computer 106 comprises securely accessing a break-glass account component 108B.

Figure 20:
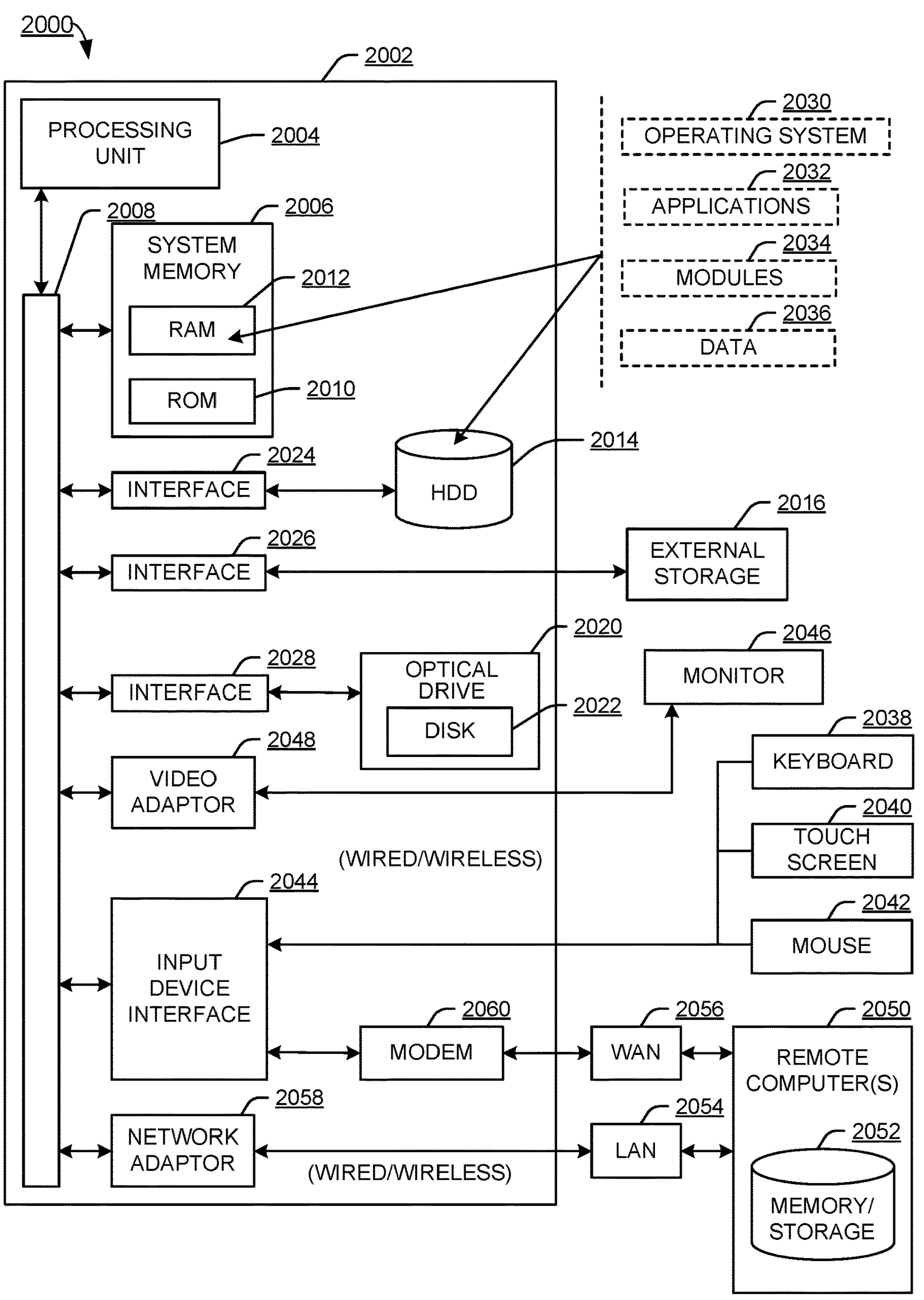
FIG. 20 illustrates an example block diagram of a computer operable to execute an embodiment of this disclosure.

Each of vendor server 102, user computer 106, and/or KMS 110 can be implemented with part(s) of computing environment 2000 of FIG. 20. Communications network 104 can comprise a computer communications network, such as the Internet.

User computer 106 can be associated with a user account to access various computing resources, and vendor server 102 can be associated with providing those resources. Where credentials for the user account are lost or changed to an unknown state, or otherwise user computer 106 cannot access resources because of a credentials issue, user computer 106 and vendor server 102 can interact via communications network 104 to provide user computer 106 with a break-glass account.

In some examples, securely accessing a break-glass account component 108A and/or securely accessing a break-glass account component 108B can implement part(s) of the process flows of FIGS. 5-19 to implement securely accessing a break-glass account.

It can be appreciated that system architecture 100 is one example system architecture for securely accessing a break-glass account, and that there can be other system architectures that facilitate securely accessing a break-glass account.

Example Signal Flows

FIG. 2 illustrates an example signal flow 200 for setting up a break-glass account, and that can facilitate securely accessing a break-glass account, in accordance with an embodiment of this disclosure. In some examples, part(s) of signal flow 200 can be used to implement part(s) of system architecture 100 to facilitate securely accessing a break-glass account.

In a setup workflow, a vendor can set up an internal application for generating cryptographic parameters and managing keys. The keys can be backed up to an external KMS. The vendor can determine a multiplicative group of integers modulo a prime p, where g is a primitive root modulo p.

In some examples, this can be performed on a per product major release basis or, a per user/deployment basis. The vendor can generate a vendor secret key (vsk) and use it to determine a corresponding vendor public key ($vpk=g^{\wedge vsk}$).

The vsk can be stored securely in the external key management server (KMS). The vpk can be embedded in a certificate (vendor-cert) signed by the vendor. The vendor can distribute the certificate vendor-cert along with the cryptographic parameter g to the customer.

In some examples, this can be performed on a per product release basis or, a per user/deployment basis.

In signal flow 200, signals are sent between vendor 202, break-glass application 204, KMS 206, and user 208.

Signal 210 is sent between vendor 202 and break-glass application 204, and comprises logging in to the break-glass application 204.

Signal 212 is sent between vendor 202 and break-glass application 204, and comprises creating a new user account, if necessary.

Signal 214 is sent between vendor 202 and break-glass application 204, and comprises initiating cryptographic parameters for the user account (e.g., multiplicative group modulo a prime p with primitive root g).

Signal 216 is sent between vendor 202 and break-glass application 204, and comprises generating a user-specific key-pair comprising a vendor secret key (vsk) and corresponding vendor public key (vpk).

Signal 218 is sent between vendor 202 and break-glass application 204, and comprises adding the vpk to a certificate signing request, and getting it signed by a vendor certificate authority (CA) to obtain a vender certificate (vendor-cert).

Signal 220 is sent between break-glass application 204 and KMS 206, and comprises storing the vsk and vendor-cert securely in KMS 206.

Signal 222 is sent between break-glass application 204 user 208, and comprises sending vendor-cert to user 208.

Figure 3:
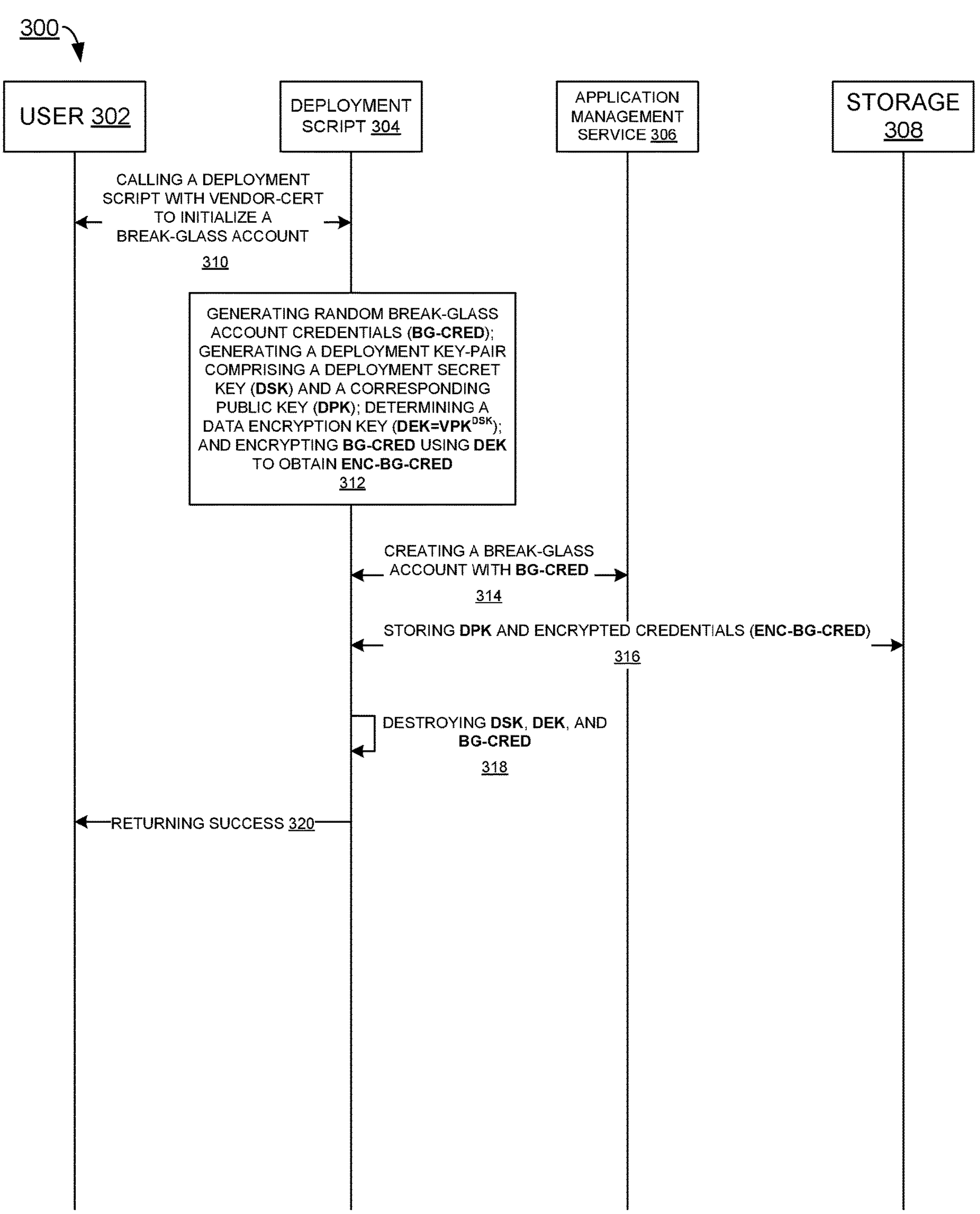
FIG. 3 illustrates an example signal flow for deploying a break-glass account, and that can facilitate securely accessing a break-glass account, in accordance with an embodiment of this disclosure.

FIG. 3 illustrates an example signal flow 300 for deploying a break-glass account, and that can facilitate securely accessing a break-glass account, in accordance with an embodiment of this disclosure. In some examples, part(s) of signal flow 200 can be used to implement part(s) of system architecture 100 to facilitate securely accessing a break-glass account.

In a deployment workflow, during deployment, a deployment script/process can generate a random break-glass account credentials (bg-cred). Along with bg-cred, the deployment script/process can also generate a deployment key-pair comprising a deployment secret key (dsk) and the corresponding deployment public key ($dpk=g^{dsk}$).

The script can further compute a data encryption key as ($dek=vpk^{dsk}$). The script can use the dek to encrypt the bg-cred (enc-bg-cred=Enc (dek, bg-cred)). The deployment public key (dpk) and encrypted credentials (enc-bg-cred) can be stored in the system, while the secrets dsk and dek are destroyed.

It can be that the dek is not recoverable with only the deployment public key (dpk) and vendor public key (vpk). Rather, it can be that the vendor secret key (vsk) is required to recover dek.

In signal flow 300, signals are sent between user 302, deployment script 304, application management service 306, and storage 308.

Signal 310 is sent between user 302 and deployment script 304, and comprises calling a deployment script with vendor-cert to initialize a break-glass account.

Signal 312 is performed by deployment script 304, and comprises generating random break-glass account credentials (bg-cred); generating a deployment key-pair comprising a deployment secret key (dsk) and a corresponding public key (dpk); determining a data encryption key ($dek=vpk^{dsk}$); and encrypting bg-cred using dek to obtain enc-bg-cred.

Signal 314 is sent between deployment script 304 and application management service 306, and comprises creating a break-glass account with bg-cred.

Signal 316 is sent between deployment script 304 and storage 308, and comprises storing dpk and encrypted credentials (enc-bg-cred).

Signal 318 is performed by deployment script 304, and comprises destroying dsk, dek, and bg-cred.

Signal 320 is sent between deployment script 304 and user 302, and comprises returning success.

Figure 4:
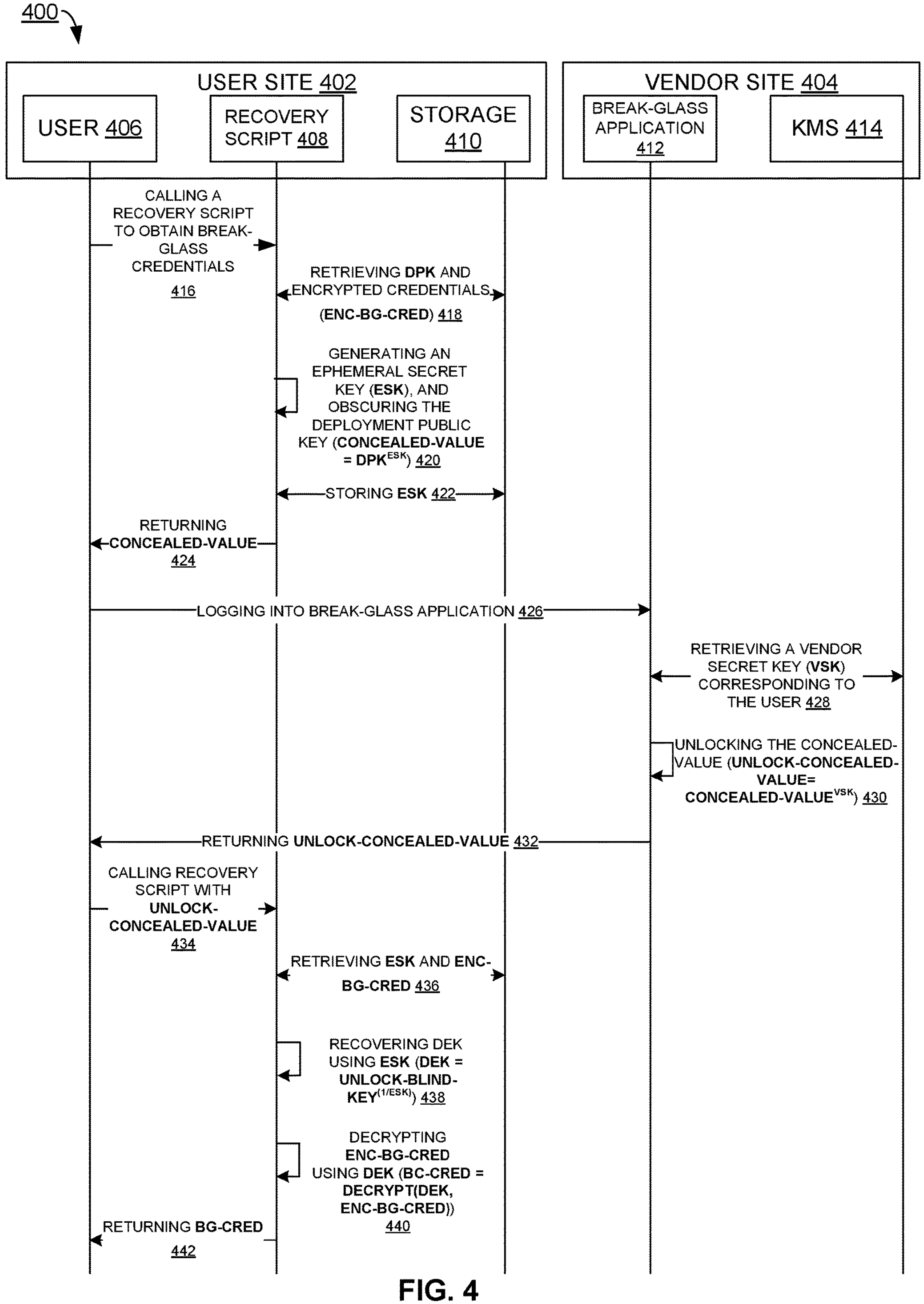
FIG. 4 illustrates an example signal flow for credential recovery with a break-glass account, and that can facilitate securely accessing a break-glass account, in accordance with an embodiment of this disclosure.

FIG. 4 illustrates an example signal flow 400 for credential recovery with a break-glass account, and that can facilitate securely accessing a break-glass account, in accordance with an embodiment of this disclosure. In some examples, part(s) of signal flow 200 can be used to implement part(s) of system architecture 100 to facilitate securely accessing a break-glass account.

In a credential recovery workflow, when access to a break-glass account is desired, a user can initiate a recovery procedure. As part of the recovery initiation, an ephemeral secret key (esk) can be generated, and the deployment public key can be concealed with esk ($\text{concealed-value}=dpk^{esk}$). The concealed value can be sent to the vendor.

The vendor can unlock the concealed value ($\text{unlock-concealed-value}=\text{concealed-value}^{vsk}$) using the vendor secret key (vsk). The unlock-concealed-value can be sent back to the user.

The user can disclose the unlock-concealed-value to recover the dek ($dek=\text{unlock-concealed-value}^{(1/esk)}$). The dek can be used to decrypt the enc-bg-cred to recover the bg-cred.

In signal flow 400, user site 402 comprises user 406, recovery script/process 408, and storage 410. And vendor site 404 comprises break-glass application 412 and KMS 414.

Signal 416 is sent between user 406 and recovery script 408, and comprises calling a recovery script/process to obtain break-glass credentials.

Signal 418 is sent between recovery script/process 408 and storage 410, and comprises retrieving dpk and encrypted credentials (enc-bg-cred).

Signal 420 is performed by recovery script/process 408, and comprises generating an ephemeral secret key (esk), and obscuring the deployment public key ($\text{concealed-value}=dpk^{esk}$).

Signal 422 is sent between recovery script 408 and storage 410, and comprises storing esk.

Signal 424 is sent between recovery script 408 and user 406, and comprises returning concealed-value.

Signal 426 is sent between user 406 and break-glass application 412, and comprises logging into break-glass application and providing the concealed-value.

Signal 428 is sent between break-glass application 412 and KMS 414, and comprises retrieving a vendor secret key (vsk) corresponding to the user.

Signal 430 is sent performed by break-glass application 412, and comprises unlocking the concealed-value ($\text{unlock-concealed-value}=\text{concealed-value}^{vsk}$).

Signal 432 is sent between break-glass application 412 and user 406, and comprises returning unlock-concealed-value.

Signal 434 is sent between user 406 and recovery script 408, and comprises calling recovery script with unlock-concealed-value.

Signal 436 is sent between recovery script 408 and storage 410, and comprises retrieving esk and enc-bg-cred.

Signal 438 is performed by recovery script 408, and comprises recovering dek using esk ($dek=\text{unlock-blind-key}^{(1/esk)}$).

Signal 440 is performed by recovery script 408, and comprises decrypting enc-bg-cred using dek (bg-cred=Decrypt(dek, enc-bg-cred)).

Signal 442 is sent between recovery script 408 and user 406, and comprises returning bg-cred.

Example Process Flows

FIG. 5 illustrates an example process flow 500 that can facilitate securely accessing a break-glass account, in accordance with an embodiment of this disclosure. In some examples, one or more embodiments of process flow 500 can be implemented by securely accessing a break-glass account component 108A of FIG. 1, or computing environment 2000 of FIG. 20.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of the process flows of FIGS. 6-19.

Process flow 500 begins with 502, and moves to operation 504.

Operation 504 depicts receiving, from a remote computer, request data that identifies a request associated with a user account for credentials that are configured to access a computing resource, wherein the request data comprises a concealed value, and wherein the concealed value comprises a deployment public key that is concealed with an ephemeral secret key. This can comprise starting a credential recovery workflow, where vendor server 102 of FIG. 1 receives the request from user computer 106. The request can contain a concealed value ($dpk^{esk}$).

After operation 504, process flow 500 moves to operation 506.

Operation 506 depicts unlocking the concealed value using a vendor secret key corresponding to the user account, to produce an unlocked concealed value. That is, vendor server 102 of FIG. 1 can unlock the concealed value (unlock-concealed=concealed-value$^{vsk}$) using the vendor secret key (vsk).

After operation 506, process flow 500 moves to operation 508.

Operation 508 depicts sending the unlocked concealed value to the remote computer, enabling the remote computer to determine a data encryption key based on processing the unlocked concealed value using the ephemeral secret key, enabling the remote computer to decrypt encrypted break-glass credentials using the data encryption key to produce break-glass credentials, and enabling the remote computer to access the computing resource using the break-glass credentials. That is, vendor server 102 of FIG. 1 can send unlock-concealed-value to user computer 106. In response, user computer 106 can recover the dek from unlock-concealed-value to (dek=unlock-concealed-value$^{(1/esk)}$), and dek can be used to decrypt the enc-bg-cred to recover the bg-cred.

After operation 508, process flow 500 moves to 510, where process flow 500 ends.

FIG. 6 illustrates an example process flow 600 that can facilitate securely accessing a break-glass account, in accordance with an embodiment of this disclosure. In some examples, one or more embodiments of process flow 600 can be implemented by securely accessing a break-glass account component 108A of FIG. 1, or computing environment 2000 of FIG. 20.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of the process flows of FIG. 5 or 7-19.

Process flow 600 begins with 602, and moves to operation 604.

Operation 604 depicts receiving request data. In some examples, this can be performed in a similar manner as operation 504 of FIG. 5.

After operation 604, process flow 600 moves to operation 606.

Operation 606 depicts obtaining the vendor secret key from a key management store based on receiving the request data. This can be performed in a similar manner as signal 428 of FIG. 4, where a vendor secret key is retrieved from KMS 414.

After operation 606, process flow 600 moves to 608, where process flow 600 ends.

FIG. 7 illustrates an example process flow 700 that can facilitate securely accessing a break-glass account, in accordance with an embodiment of this disclosure. In some examples, one or more embodiments of process flow 700 can be implemented by securely accessing a break-glass account component 108A of FIG. 1, or computing environment 2000 of FIG. 20.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of the process flows of FIG. 5-6 or 8-19.

Process flow 700 begins with 702, and moves to operation 704.

Operation 704 depicts receiving, from a remote computer, request data that identifies a request associated with a user account for credentials that are configured to access a computing resource. In some examples, this can be performed in a similar manner as operation 504 of FIG. 5.

After operation 704, process flow 700 moves to operation 706.

Operation 706 depicts initializing cryptographic parameters for the user account, wherein the cryptographic parameters comprise a first number that is a primitive root modulo of a second number, and wherein the second number is a prime number. That is, vendor server 102 of FIG. 1 can determine a multiplicative group of integers modulo a prime p, where g is a primitive root modulo p.

In some examples, the initializing is performed for a group of user accounts that comprises the user account, and wherein respective user accounts of the group of user accounts are configured to access the computing resource. In some examples, the initializing is performed on a per user account basis. In some examples, the initializing is performed on a per deployment basis, and wherein the user account is associated with multiple deployments. That is, in some examples, initializing cryptographic parameters can be performed on a per product major release basis or a per customer/deployment basis.

In some examples, the initializing is performed independently of receiving the request data (e.g., it can be performed for a per product major release, with the request data being received subsequent to the initializing).

In some examples, the cryptographic parameters are initialized for a group of user accounts that comprises the user account, and the vendor secret key is specific to the user account. That is, the initializing can involve a customer-specific vendor secret (vsk) and corresponding vendor public key (vpk).

After operation 706, process flow 700 moves to 708, where process flow 700 ends.

Figure 8:
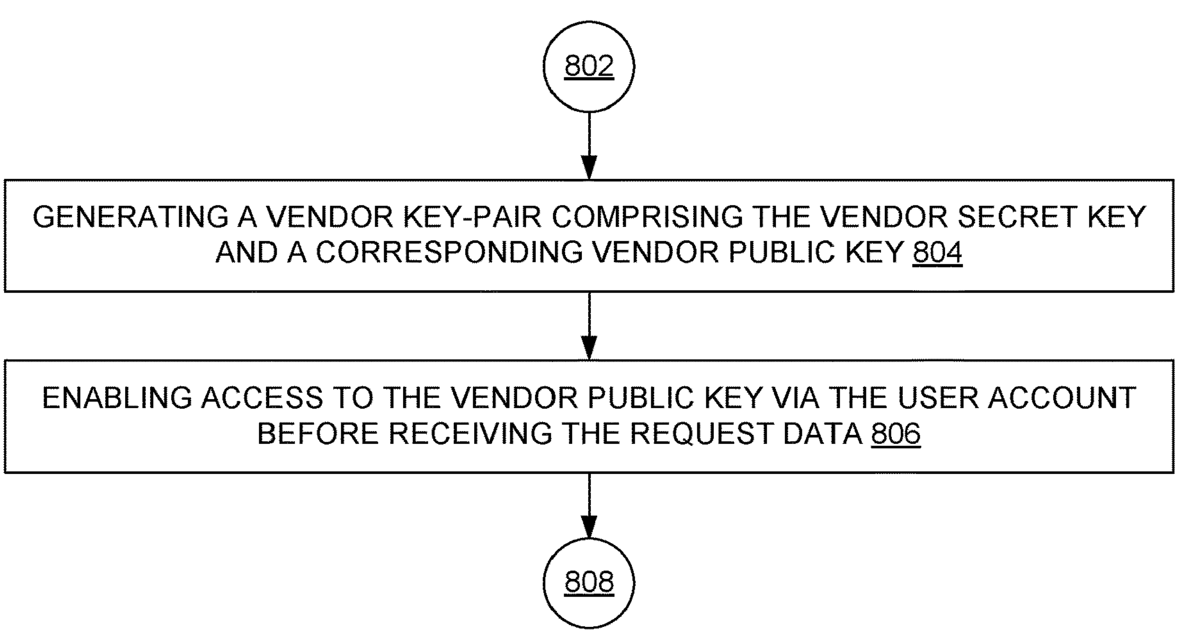
FIG. 8 illustrates another example process flow that can facilitate securely accessing a break-glass account, in accordance with an embodiment of this disclosure.

FIG. 8 illustrates an example process flow 800 that can facilitate securely accessing a break-glass account, in accordance with an embodiment of this disclosure. In some examples, one or more embodiments of process flow 800 can be implemented by securely accessing a break-glass account component 108A of FIG. 1, or computing environment 2000 of FIG. 20.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of the process flows of FIG. 5-7 or 9-19.

Process flow 800 begins with 802, and moves to operation 804.

Operation 804 depicts generating a vendor key-pair comprising the vendor secret key and a corresponding vendor public key. These keys can be vsk and vpk, respectively.

After operation 804, process flow 800 moves to operation 806.

Operation 806 depicts enabling access to the vendor public key via the user account before receiving the request data. This can be performed in a similar manner as process flow 900 of FIG. 9.

After operation 806, process flow 800 moves to 808, where process flow 800 ends.

FIG. 9 illustrates an example process flow 900 that can facilitate securely accessing a break-glass account, in accordance with an embodiment of this disclosure. In some examples, one or more embodiments of process flow 900 can be implemented by securely accessing a break-glass account component 108A of FIG. 1, or computing environment 2000 of FIG. 20.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of the process flows of FIG. 5-8 or 10-19.

In some examples, process flow 900 can be used to implement operation 806 of FIG. 8.

Process flow 900 begins with 902, and moves to operation 904.

Operation 904 depicts adding the vendor public key to a certificate signing request.

After operation 904, process flow 900 moves to operation 906.

Operation 906 depicts processing the certificate signing request by a certificate authority that is associated with the system, to produce a signed certificate. This signed certificate can be vendor-cert, and vpk can be embedded in vendor-cert that is signed by an entity associated with vendor server 102 of FIG. 1.

After operation 906, process flow 900 moves to operation 908.

Operation 908 depicts enabling access to the signed certificate via the user account. That is, vendor server 102 of FIG. 1 can distribute the certificate vendor-cert along with the cryptographic parameter g to user computer 106.

After operation 908, process flow 900 moves to 910, where process flow 900 ends.

FIG. 10 illustrates an example process flow 1000 that can facilitate securely accessing a break-glass account, in accordance with an embodiment of this disclosure. In some examples, one or more embodiments of process flow 1000 can be implemented by securely accessing a break-glass account component 108A of FIG. 1, or computing environment 2000 of FIG. 20.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of the process flows of FIG. 5-9 or 11-19.

Process flow 1000 begins with 1002, and moves to operation 1004.

Operation 1004 depicts receiving, from a remote computer, request data that identifies a request from a user account for credentials that are configured to access a computing resource, wherein the request data comprises a first value, and wherein the first value comprises a deployment public key that is concealed with an ephemeral key. In some examples, operation 1004 can be implemented in a similar manner as operation 504 of FIG. 5. In some examples, the first value can be a blinded value, and the secret binding key can be an ephemeral secret binding key.

After operation 1004, process flow 1000 moves to operation 1006.

Operation 1006 depicts unlocking the first value with a vendor secret key, to produce a second value. In some examples, operation 1006 can be implemented in a similar manner as operation 506 of FIG. 5. In some examples, the second value can be an unlocked concealed value.

After operation 1006, process flow 1000 moves to operation 1008.

Operation 1008 depicts sending the second value to the remote computer, as a result of which the remote computer is able to determine a data encryption key based on processing the second value with the ephemeral secret key, decrypt encrypted credentials with the data encryption key to produce the credentials, and access the computing resource using the credentials. In some examples, the credentials can be break-glass credentials.

In some examples, operation 1008 can be implemented in a similar manner as operation 508 of FIG. 5.

After operation 1008, process flow 1000 moves to 1010, where process flow 1000 ends.

Figure 11:
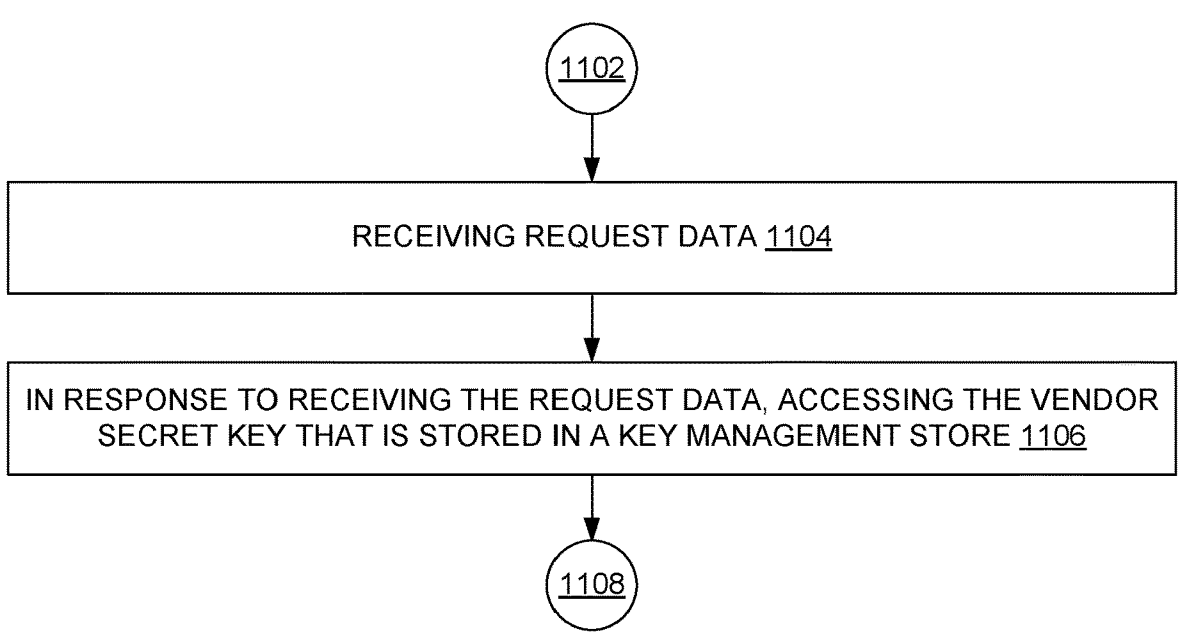
FIG. 11 illustrates another example process flow that can facilitate securely accessing a break-glass account, in accordance with an embodiment of this disclosure.

FIG. 11 illustrates an example process flow 1100 that can facilitate securely accessing a break-glass account, in accordance with an embodiment of this disclosure. In some examples, one or more embodiments of process flow 1100 can be implemented by securely accessing a break-glass account component 108A of FIG. 1, or computing environment 2000 of FIG. 20.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of the process flows of FIG. 5-10 or 12-19.

Process flow 1100 begins with 1102, and moves to operation 1104.

Operation 1104 depicts receiving request data. This can be performed in a similar manner as operation 1004 of FIG. 10.

After operation 1104, process flow 1100 moves to operation 1106.

Operation 1106 depicts, in response to receiving the request data, accessing the vendor secret key that is stored in a key management store. This can be performed in a similar manner as signal 428 of FIG. 4, where a vendor secret key is retrieved from KMS 414.

After operation 1106, process flow 1100 moves to 1108, where process flow 1100 ends.

FIG. 12 illustrates an example process flow 1200 that can facilitate securely accessing a break-glass account, in accordance with an embodiment of this disclosure. In some examples, one or more embodiments of process flow 1200 can be implemented by securely accessing a break-glass account component 108A of FIG. 1, or computing environment 2000 of FIG. 20.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of the process flows of FIG. 5-11 or 13-19.

Process flow 1200 begins with 1202, and moves to operation 1204.

Operation 1204 depicts receiving, from a remote computer, request data that identifies a request associated with a user account for credentials that are configured to access a computing resource. This can be performed in a similar manner as operation 1004 of FIG. 10.

After operation 1204, process flow 1200 moves to operation 1206.

Operation 1206 depicts initializing cryptographic parameters for the user account, wherein the cryptographic parameters comprise a first number and a second number, wherein the first number comprises a primitive root modulo of the second number, and wherein the second number comprises a prime number. That is, vendor server 102 of FIG. 1 can determine a multiplicative group of integers modulo a prime p, where g is a primitive root modulo p.

In some examples, the user account is a first user account, and the cryptographic parameters are configured to be used for the first user account and a second user account. That is, cryptographic parameters can be initialized once for multiple users.

After operation 1206, process flow 1200 moves to 1208, where process flow 1200 ends.

Figure 13:
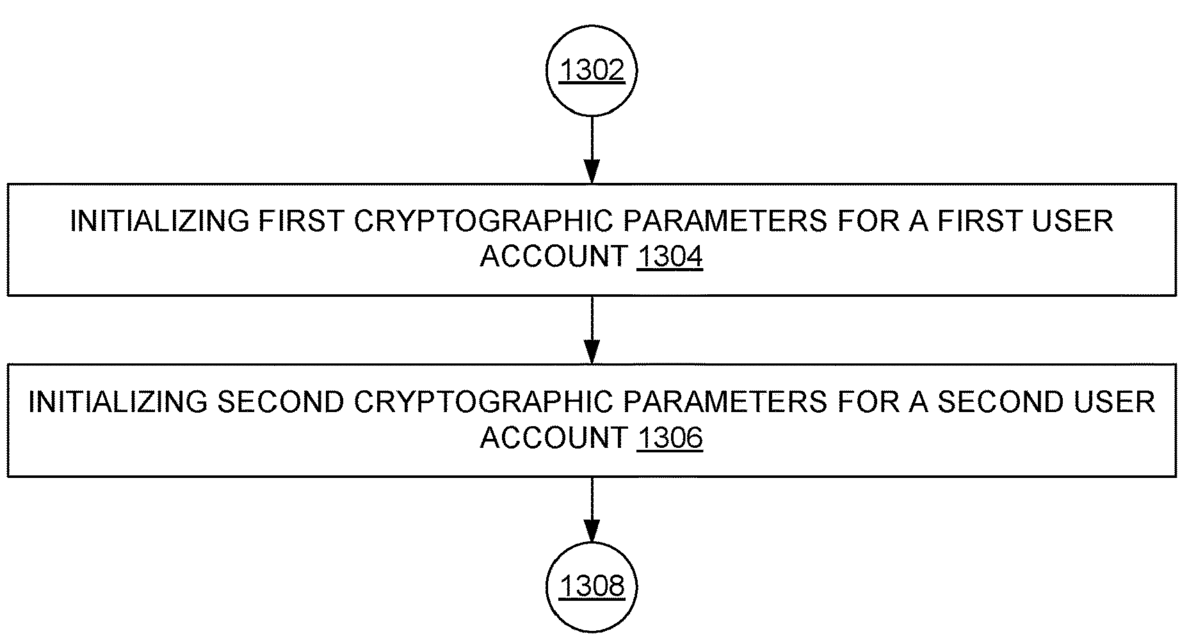
FIG. 13 illustrates another example process flow that can facilitate securely accessing a break-glass account, in accordance with an embodiment of this disclosure.

FIG. 13 illustrates an example process flow 1300 that can facilitate securely accessing a break-glass account, in accordance with an embodiment of this disclosure. In some examples, one or more embodiments of process flow 1300 can be implemented by securely accessing a break-glass account component 108A of FIG. 1, or computing environment 2000 of FIG. 20.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of the process flows of FIG. 5-12 or 14-19.

Process flow 1300 can be implemented in conjunction with process flow 1200, where the user account is a first user account, and the cryptographic parameters are first cryptographic parameters.

Process flow 1300 begins with 1302, and moves to operation 1304.

Operation 1304 depicts initializing first cryptographic parameters for a first user account. This can be performed in a similar manner as operation 1206 of FIG. 12.

After operation 1304, process flow 1300 moves to operation 1306.

Operation 1306 depicts initializing second cryptographic parameters for a second user account. This can be performed in a similar manner as operation 1206 of FIG. 12, as applied to a different user account than in operation 1304. In this manner, there can be examples where different cryptographic parameters are initialized for different user accounts (that is, cryptographic parameters can be initialized on a per user account basis).

After operation 1306, process flow 1300 moves to 1308, where process flow 1300 ends.

Figure 14:
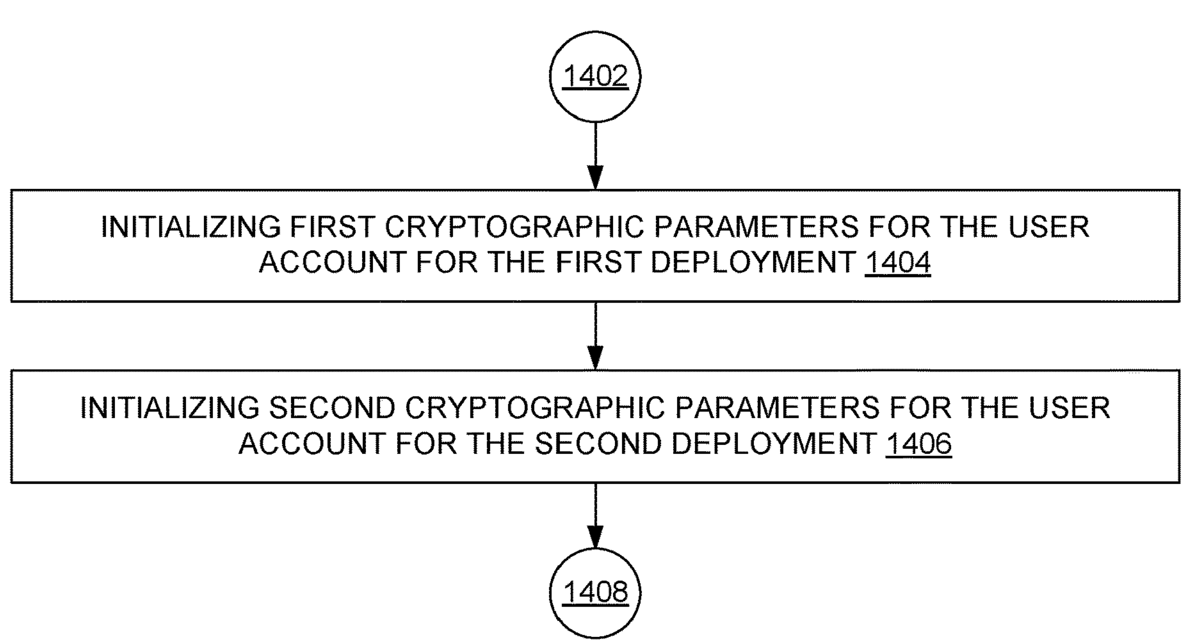
FIG. 14 illustrates another example process flow that can facilitate securely accessing a break-glass account, in accordance with an embodiment of this disclosure.

FIG. 14 illustrates an example process flow 1400 that can facilitate securely accessing a break-glass account, in accordance with an embodiment of this disclosure. In some examples, one or more embodiments of process flow 1400 can be implemented by securely accessing a break-glass account component 108A of FIG. 1, or computing environment 2000 of FIG. 20.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of the process flows of FIG. 5-13 or 15-19.

Process flow 1400 can be implemented in conjunction with process flow 1200, where the user account is associated with a first deployment and a second deployment, and the cryptographic parameters are first cryptographic parameters.

Process flow 1400 begins with 1402, and moves to operation 1404.

Operation 1404 depicts initializing first cryptographic parameters for the user account for the first deployment. This can be performed in a similar manner as operation 1206 of FIG. 12.

After operation 1404, process flow 1400 moves to operation 1406.

Operation 1406 depicts initializing second cryptographic parameters for the user account for the second deployment. This can be performed in a similar manner as operation 1206 of FIG. 12, as applied to a different user deployment than in operation 1304. In this manner, there can be examples where different cryptographic parameters are initialized for a given user account for each deployment with which the user account is associated (that is, cryptographic parameters can be initialized on a per deployment basis).

After operation 1406, process flow 1400 moves to 1408, where process flow 1400 ends.

Figure 15:
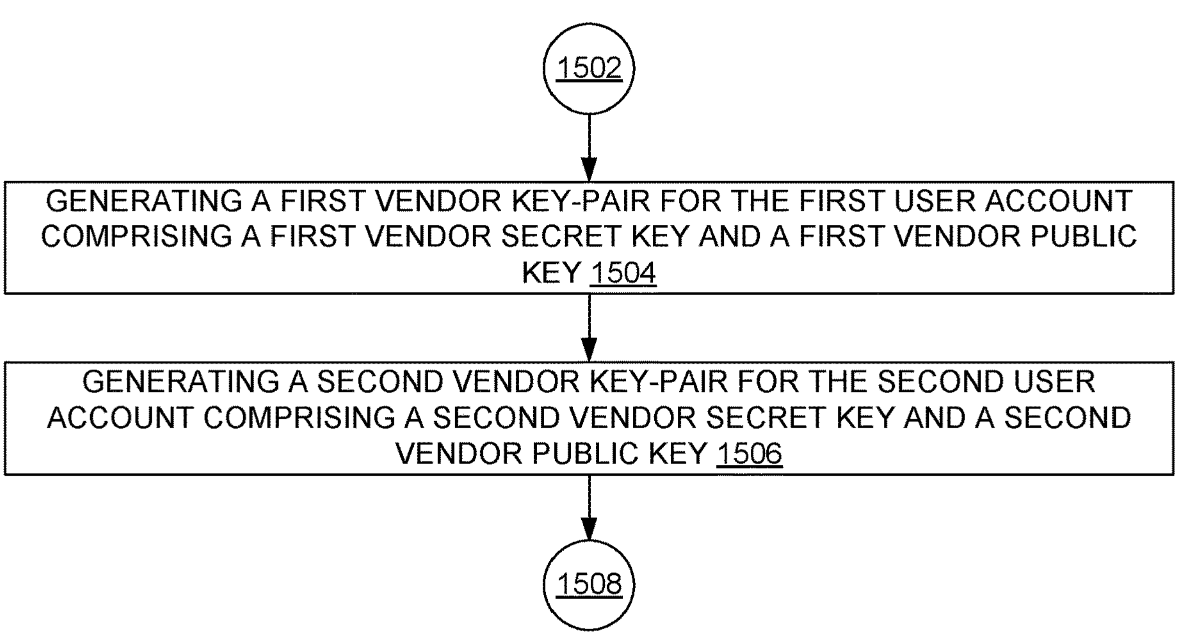
FIG. 15 illustrates another example process flow that can facilitate securely accessing a break-glass account, in accordance with an embodiment of this disclosure.

FIG. 15 illustrates an example process flow 1500 that can facilitate securely accessing a break-glass account, in accordance with an embodiment of this disclosure. In some examples, one or more embodiments of process flow 1500 can be implemented by securely accessing a break-glass account component 108A of FIG. 1, or computing environment 2000 of FIG. 20.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of one or more of the process flows of FIG. 5-14 or 16-19.

Process flow 1500 can be implemented in conjunction with process flow 1200, where the user account is a first user account, the cryptographic parameters are configured to be used for the first user account and a second user account, and the vendor secret key is a first vendor secret key.

Process flow 1500 begins with 1502, and moves to operation 1504.

Operation 1504 depicts generating a first vendor key-pair for the first user account comprising a first vendor secret key and a first vendor public key. In some examples, these two keys can be similar to vsk and vpk, respectively, as described herein, and can be specific to the first user account.

After operation 1504, process flow 1500 moves to operation 1506.

Operation 1506 depicts generating a second vendor key-pair for the second user account comprising a second vendor secret key and a second vendor public key. This can be performed in a similar manner as operation 1504, as applied to a second user account compared to a first user account in operation 1504. In this manner, user-specific vendor secret keys can be generated.

After operation 1506, process flow 1500 moves to 1508, where process flow 1500 ends.

FIG. 16 illustrates an example process flow 1600 that can facilitate securely accessing a break-glass account, in accordance with an embodiment of this disclosure. In some examples, one or more embodiments of process flow 1600 can be implemented by securely accessing a break-glass account component 108A of FIG. 1, or computing environment 2000 of FIG. 20.

It can be appreciated that the operating procedures of process flow 1600 are example operating procedures, and that there can be embodiments that implement more or fewer operating procedures than are depicted, or that implement the depicted operating procedures in a different order than as depicted. In some examples, process flow 1600 can be implemented in conjunction with one or more embodiments of one or more of the process flows of FIG. 5-15 or 17-19.

Process flow 1600 begins with 1602, and moves to operation 1604.

Operation 1604 depicts receiving, from a remote computer, request data that identifies a request from a user account for credentials that are configured to access a computing resource, wherein the request data comprises a value, and wherein the value comprises a first public key that is encoded with a second secret key. In some examples, operation 1604 can be implemented in a similar manner as operation 504 of FIG. 5. In some examples, the value can be a concealed value, the first public key can be a deployment public key, the second secret key can be an ephemeral secret key, and the credentials can be break-glass credentials.

After operation 1604, process flow 1600 moves to operation 1606.

Operation 1606 depicts unlocking the value with a third secret key, to produce a second value. In some examples, operation 1606 can be implemented in a similar manner as operation 506 of FIG. 5. In some examples, the third secret key can be a vendor secret key, and the second value can be an unlocked blinded value.

After operation 1606, process flow 1600 moves to operation 1608.

Operation 1608 depicts sending the second value to the remote computer, the remote computer determining a data encryption key based on processing the second value with the second secret key, the remote computer decrypting encrypted credentials with the data encryption key to produce the credentials, and the remote computer accessing the computing resource using the credentials. In some examples, operation 1608 can be implemented in a similar manner as operation 508 of FIG. 5. In some examples, the credentials can be break-glass credentials After operation 1608, process flow 1600 moves to 1610, where process flow 1600 ends.

Figure 17:
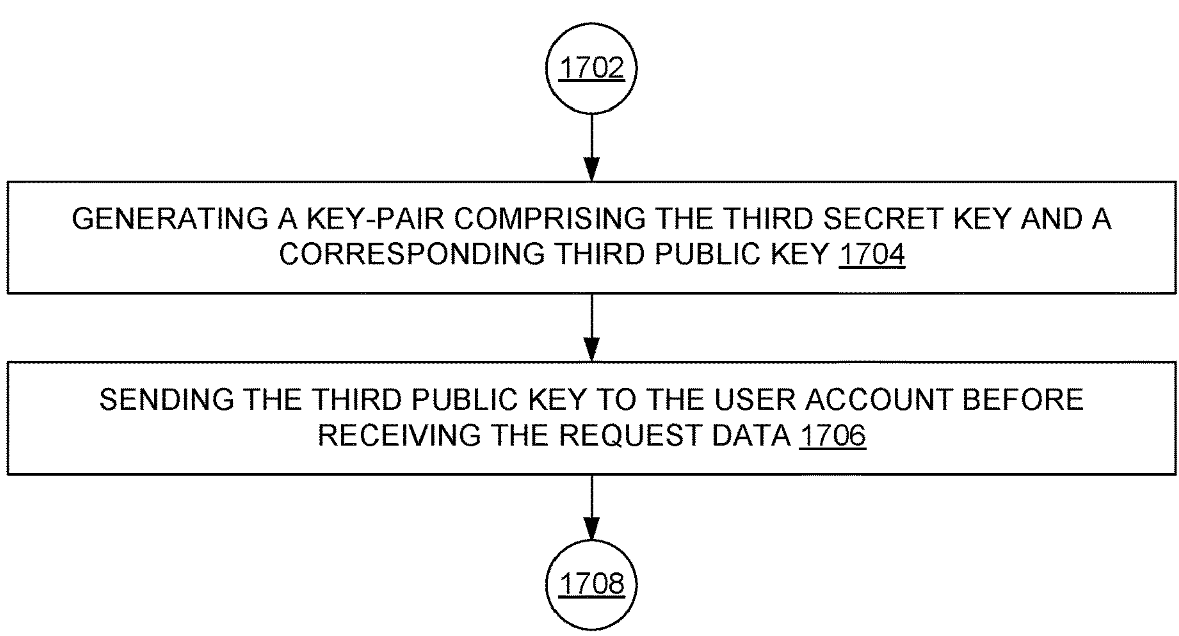
FIG. 17 illustrates another example process flow that can facilitate securely accessing a break-glass account, in accordance with an embodiment of this disclosure.

FIG. 17 illustrates an example process flow 1700 that can facilitate securely accessing a break-glass account, in accordance with an embodiment of this disclosure. In some examples, one or more embodiments of process flow 1700 can be implemented by securely accessing a break-glass account component 108A of FIG. 1, or computing environment 2000 of FIG. 20.

It can be appreciated that the operating procedures of process flow 1700 are example operating procedures, and that there can be embodiments that implement more or fewer operating procedures than are depicted, or that implement the depicted operating procedures in a different order than as depicted. In some examples, process flow 1700 can be implemented in conjunction with one or more embodiments of one or more of the process flows of FIG. 5-16 or 18-19.

In some examples, process flow 1700 can be implemented in conjunction with process flow 1600 of FIG. 16, where a first secret key, a second secret key, and a third secret key are utilized.

Process flow 1700 begins with 1702, and moves to operation 1704.

Operation 1704 depicts generating a key-pair comprising the third secret key and a corresponding third public key. This can comprise generating a customer-specific vendor secret (vsk) and corresponding vendor public key (vpk).

After operation 1704, process flow 1700 moves to operation 1706.

Operation 1706 depicts sending the third public key to the user account before receiving the request data.

After operation 1706, process flow 1700 moves to 1708, where process flow 1700 ends.

Figure 18:
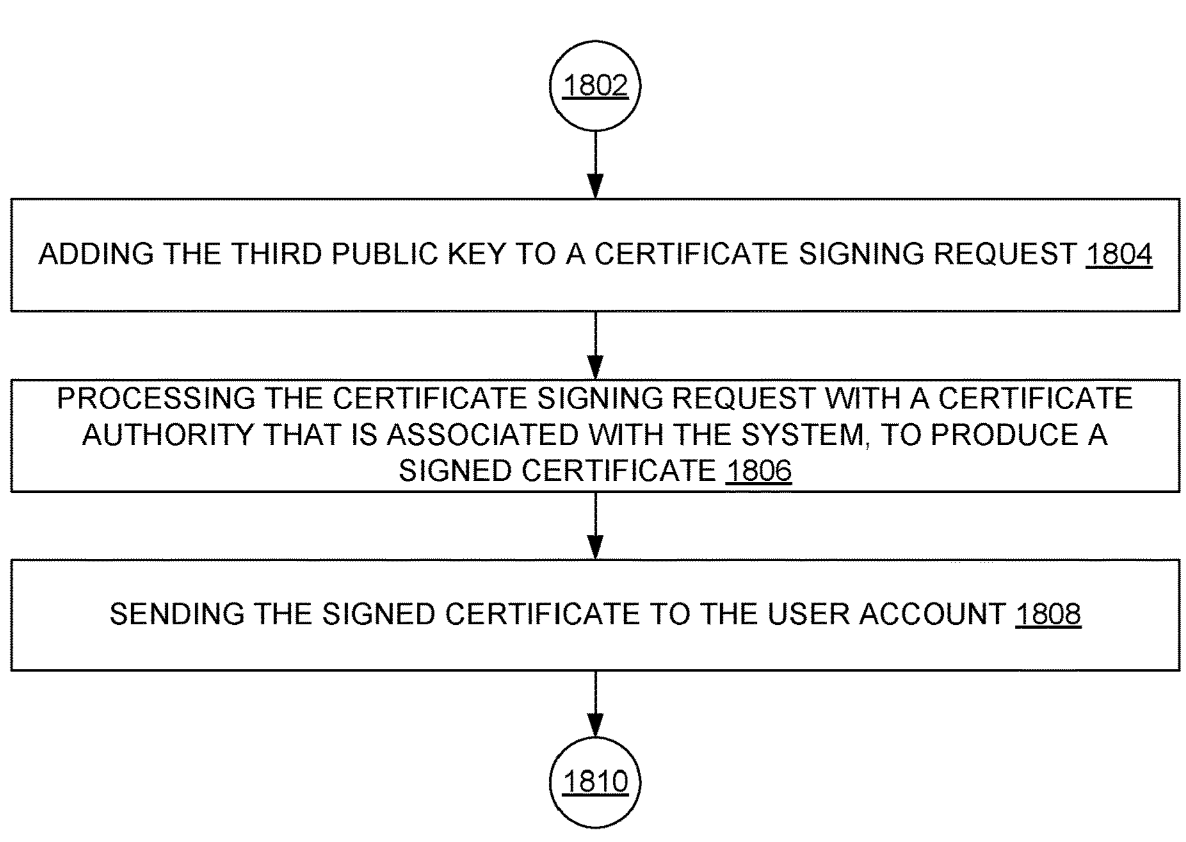
FIG. 18 illustrates another example process flow that can facilitate securely accessing a break-glass account, in accordance with an embodiment of this disclosure.

FIG. 18 illustrates an example process flow 1800 that can facilitate securely accessing a break-glass account, in accordance with an embodiment of this disclosure. In some examples, one or more embodiments of process flow 1800 can be implemented by securely accessing a break-glass account component 108A of FIG. 1, or computing environment 2000 of FIG. 20.

It can be appreciated that the operating procedures of process flow 1800 are example operating procedures, and that there can be embodiments that implement more or fewer operating procedures than are depicted, or that implement the depicted operating procedures in a different order than as depicted. In some examples, process flow 1800 can be implemented in conjunction with one or more embodiments of one or more of the process flows of FIG. 5-17 or 19.

In some examples, process flow 1800 can be used to implement operation 1706 of FIG. 17.

Process flow 1800 begins with 1802, and moves to operation 1804.

Operation 1804 depicts adding the third public key to a certificate signing request. This can comprise adding vpk to a certificate signing request.

After operation 1804, process flow 1800 moves to operation 1806.

Operation 1806 depicts processing the certificate signing request with a certificate authority that is associated with the system, to produce a signed certificate. This can comprise getting the certificate signing request of operation 1804 signed by a certificate authority associated with vendor server 102 of FIG. 1.

After operation 1806, process flow 1800 moves to operation 1808.

Operation 1808 depicts sending the signed certificate to the user account. That is, vendor server 102 of FIG. 1 can distribute the certificate vendor-cert to user computer 106.

After operation 1808, process flow 1800 moves to 1810, where process flow 1800 ends.

Figure 19:
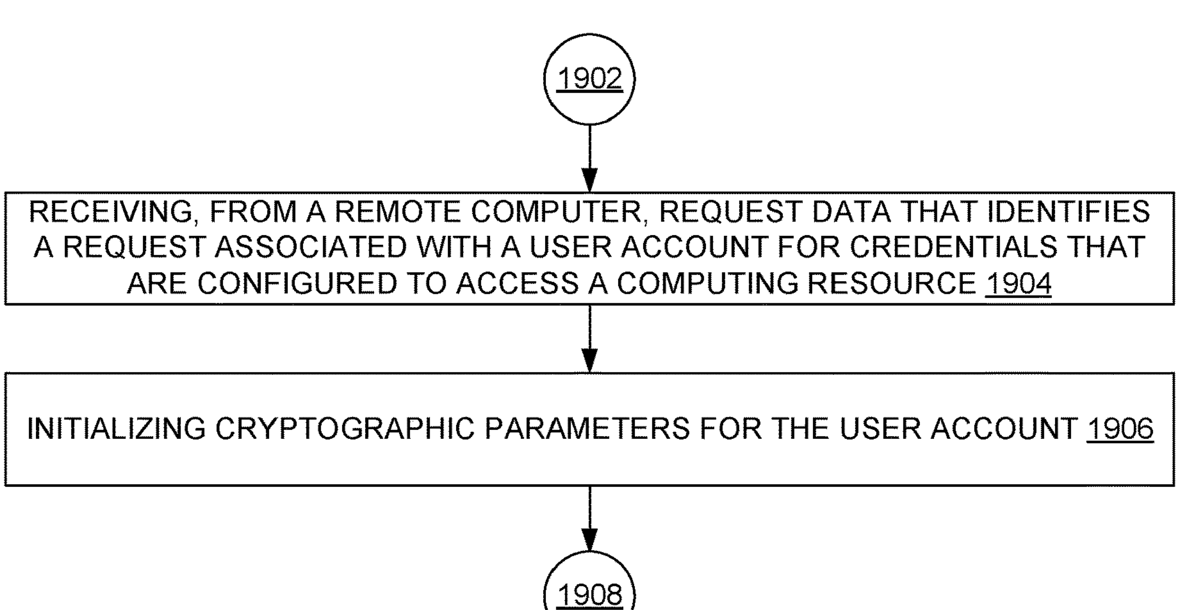
FIG. 19 illustrates another example process flow that can facilitate securely accessing a break-glass account, in accordance with an embodiment of this disclosure.

FIG. 19 illustrates an example process flow 1900 that can facilitate securely accessing a break-glass account, in accordance with an embodiment of this disclosure. In some examples, one or more embodiments of process flow 1900 can be implemented by securely accessing a break-glass account component 108A of FIG. 1, or computing environment 2000 of FIG. 20.

It can be appreciated that the operating procedures of process flow 1900 are example operating procedures, and that there can be embodiments that implement more or fewer operating procedures than are depicted, or that implement the depicted operating procedures in a different order than as depicted. In some examples, process flow 1900 can be implemented in conjunction with one or more embodiments of one or more of the process flows of FIGS. 5-18.

Process flow 1900 begins with 1902, and moves to operation 1904.

Operation 1904 depicts receiving, from a remote computer, request data that identifies a request associated with a user account for credentials that are configured to access a computing resource. In some examples, operation 1904 can be implemented in a similar manner as operation 1204 of FIG. 12.

After operation 1904, process flow 1900 moves to operation 1906.

Operation 1906 depicts initializing cryptographic parameters for the user account. That is, vendor server 102 of FIG. 1 can determine a multiplicative group of integers modulo a prime p, where g is a primitive root modulo p.

After operation 1906, process flow 1900 moves to 1908, where process flow 1900 ends.

Example Operating Environment

In order to provide additional context for various embodiments described herein, FIG. 20 and the following discussion are intended to provide a brief, general description of a suitable computing environment 2000 in which the various embodiments of the embodiment described herein can be implemented.

For example, parts of computing environment 2000 can be used to implement one or more embodiments of vendor server 102, user computer 106, and/or KMS 110 of FIG. 1.

In some examples, computing environment 2000 can implement one or more embodiments of the process flows of FIGS. 5-19 to facilitate securely accessing a break-glass account.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example environment 2000 for implementing various embodiments described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a nonvolatile storage such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and optical disk drive 2020 (containing disk 2022) can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for applications 2032. Runtime environments are consistent execution environments that allow applications 2032 to run on any operating system that includes the runtime environment. Similarly, operating system 2030 can support containers, and applications 2032 can be in the form of containers, which are lightweight, standalone, executable packages of software that include, e.g., code, runtime, system tools, system libraries and settings for an application.

Further, computer 2002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2046 or other type of display device can be also connected to the system bus 2008 via an interface, such as a video adapter 2048. In addition to the monitor 2046, a computer typically includes other peripheral output devices (not shown), such as speakers, printers, etc.

The computer 2002 can operate in a networked environment using logical connections via wired and/or wireless communications to one or more remote computers, such as a remote computer(s) 2050. The remote computer(s) 2050 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2052 is illustrated. The logical connections depicted include wired/wireless connectivity to a local area network (LAN) 2054 and/or larger networks, e.g., a wide area network (WAN) 2056. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2054 through a wired and/or wireless communication network interface or adapter 2058. The adapter 2058 can facilitate wired or wireless communication to the LAN 2054, which can also include a wireless access point (AP) disposed thereon for communicating with the adapter 2058 in a wireless mode.

When used in a WAN networking environment, the computer 2002 can include a modem 2060 or can be connected to a communications server on the WAN 2056 via other means for establishing communications over the WAN 2056, such as by way of the Internet. The modem 2060, which can be internal or external and a wired or wireless device, can be connected to the system bus 2008 via the input device interface 2044. In a networked environment, program modules depicted relative to the computer 2002 or portions thereof, can be stored in the remote memory/storage device 2052. It will be appreciated that the network connections shown are examples, and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2054 or WAN 2056 e.g., by the adapter 2058 or modem 2060, respectively. Upon connecting the computer 2002 to an associated cloud storage system, the external storage interface 2026 can, with the aid of the adapter 2058 and/or modem 2060, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

based on receiving first request data that identifies a first request associated with a user account to generate break-glass credentials associated with the user account, generating a deployment key-pair comprising a deployment secret key and a corresponding deployment public key, determining a data encryption key based on the deployment secret key and a vendor public key, and encrypting the break-glass credentials with the data encryption key, to produce encrypted break-glass credentials;

receiving, from a remote computer, log in credentials to log into the system, and second request data that identifies a second request associated with the user account for credentials that are configured to access a computing resource, wherein the second request data comprises a concealed value, and wherein the concealed value comprises the corresponding deployment public key that is concealed with an ephemeral secret key;

based on logging the user account into the system using the log in credentials, unlocking the concealed value using a vendor secret key corresponding to the user account, to produce an unlocked concealed value; and sending the unlocked concealed value to the remote computer, enabling the remote computer to determine the data encryption key based on processing the unlocked concealed value using the ephemeral secret key, enabling the remote computer to decrypt the encrypted break-glass credentials using the data encryption key to produce the break-glass credentials, and enabling the remote computer to access the computing resource using the break-glass credentials.

2. The system of claim 1, wherein the operations further comprise:

obtaining the vendor secret key from a key management store based on receiving the request data.

3. The system of claim 1, wherein the operations further comprise:

initializing cryptographic parameters for the user account, wherein the cryptographic parameters comprise a first number that is a primitive root modulo of a second number, and wherein the second number is a prime number.

4. The system of claim 3, wherein the initializing is performed for a group of user accounts that comprises the user account, and wherein respective user accounts of the group of user accounts are configured to access the computing resource.

5. The system of claim 3, wherein the initializing is performed on a per user account basis.

6. The system of claim 3, wherein the initializing is performed on a per site basis, wherein a site comprises a group of at least one computer, and wherein the user account is associated with multiple sites.

7. The system of claim 3, wherein the cryptographic parameters are initialized for a group of user accounts that comprises the user account, and wherein the vendor secret key is specific to the user account.

8. The system of claim 1, wherein the operations further comprise:

generating a vendor key-pair comprising the vendor secret key and the vendor public key; and enabling access to the vendor public key via the user account before receiving the request data.

9. The system of claim 8, wherein enabling the access to the vendor public key via the user account comprises:

adding the vendor public key to a certificate signing request;

processing the certificate signing request with a certificate authority that is associated with the system, to produce a signed certificate; and enabling access to the signed certificate via the user account.

10. A method, comprising:

based on receiving first request data that identifies a first request associated with a user account to generate credentials associated with the user account, generating, by a system comprising at least one processor, a deployment key-pair comprising a deployment secret key and a corresponding deployment public key, determining, by the system, a data encryption key based on the deployment secret key and a vendor public key, and encrypting, by the system, the credentials with the data encryption key, to produce encrypted credentials;

receiving, by the system and from a remote computer, log in credentials to log into the system, and second request data that identifies a second request from the user account for the credentials that are configured to access a computing resource, wherein the second request data comprises a first value, and wherein the first value comprises the corresponding deployment public key that is concealed with an ephemeral secret key;

based on logging the user account into the system using the log in credentials, unlocking, by the system, the first value with a vendor secret key, to produce a second value; and sending, by the system, the second value to the remote computer, as a result of which the remote computer is able to determine the data encryption key based on processing the second value with the ephemeral secret key, decrypt the encrypted credentials with the data encryption key to produce the credentials, and access the computing resource using the credentials.

11. The method of claim 10, further comprising:

in response to receiving the request data, accessing, by the system, the vendor secret key that is stored in a key management store.

12. The method of claim 10, further comprising:

initializing, by the system, cryptographic parameters for the user account, wherein the cryptographic parameters comprise a first number and a second number, wherein the first number comprises a primitive root modulo of the second number, and wherein the second number comprises a prime number.

13. The method of claim 12, wherein the user account is a first user account, and wherein the cryptographic parameters are configured to be used for the first user account and a second user account.

14. The method of claim 12, wherein the user account is a first user account, wherein the cryptographic parameters are first cryptographic parameters, and further comprising:

initializing, by the system, second cryptographic parameters for a second user account.

15. The method of claim 12, wherein the user account is associated with a first site that comprises a first group of at least one computer and a second site that comprises a second group of at least one computer, wherein the cryptographic parameters are first cryptographic parameters, and further comprising:

initializing, by the system, second cryptographic parameters for the user account for the second site.

16. The method of claim 12, wherein the user account is a first user account, wherein the cryptographic parameters are configured to be used for the first user account and a second user account, wherein the vendor secret key is a first vendor secret key, wherein the vendor public key is a first vendor public key, and further comprising:

generating, by the system, a second vendor key-pair for the second user account comprising a second vendor secret key and a second vendor public key.

17. A non-transitory computer-readable medium comprising instructions that, in response to execution, cause at least one system comprising a processor to perform operations, comprising:

based on receiving first request data that identifies a first request associated with a user account to generate credentials associated with the user account, generating a deployment key-pair comprising a first secret key and a corresponding first public key, determining a data encryption key based on the first secret key and a vendor public key, and encrypting the credentials with the data encryption key, to produce encrypted credentials;

receiving, from a remote computer, log in credentials to log into the system, and second request data that identifies a second request from the user account for credentials that are configured to access a computing resource, wherein the second request data comprises a value, and wherein the value comprises a first public key that is encoded with a second secret key;

based on logging the user account into the system using the log in credentials, unlocking the value with a third secret key, to produce a second value; and sending the second value to the remote computer, the remote computer determining a data encryption key based on processing the second value with the second secret key, the remote computer decrypting encrypted credentials with the data encryption key to produce the credentials, and the remote computer accessing the computing resource using the credentials.

18. The non-transitory computer-readable medium of claim 17, wherein the operations further comprise:

generating a key-pair comprising the third secret key and a corresponding third public key; and sending the third public key to the user account before receiving the request data.

19. The non-transitory computer-readable medium of claim 18, wherein sending the third public key to the user account before receiving the request data comprises:

adding the third public key to a certificate signing request;

processing the certificate signing request with a certificate authority that is associated with the system, to produce a signed certificate; and sending the signed certificate to the user account.

20. The non-transitory computer-readable medium of claim 17, wherein the operations further comprise:

initializing cryptographic parameters for the user account.

* * * * *